United States Patent [19]
Tsuruoka

[11] Patent Number: 6,019,453
[45] Date of Patent: *Feb. 1, 2000

[54] PRINTING APPARATUS AND METHOD

[75] Inventor: Yuji Tsuruoka, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/727,235

[22] Filed: Oct. 8, 1996

[30] Foreign Application Priority Data

Dec. 10, 1995 [JP] Japan .................................... 7-263917

[51] Int. Cl.[7] ................................ B41J 2/21; B41J 2/145; B41J 2/15
[52] U.S. Cl. ................................ 347/40; 347/43
[58] Field of Search .................... 347/40, 43, 15, 347/5

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,812,859 | 3/1989 | Chan et al. | 347/43 |
| 5,359,355 | 10/1994 | Nagoshi et al. | 347/9 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

In a printing apparatus for performing a print operation by scanning a print head having a plurality of printing elements in a direction perpendicular to the convey direction of a recording medium, a divisional print operation is performed by using the print head upon setting print timing differences for a plurality of blocks obtained by dividing the plurality of printing elements. In this case, a command to finely change the print timing differences is input through an input unit, and the print operation is controlled to perform a divisional print operation by finely adjusting the print timing differences on the basis of the command.

12 Claims, 12 Drawing Sheets

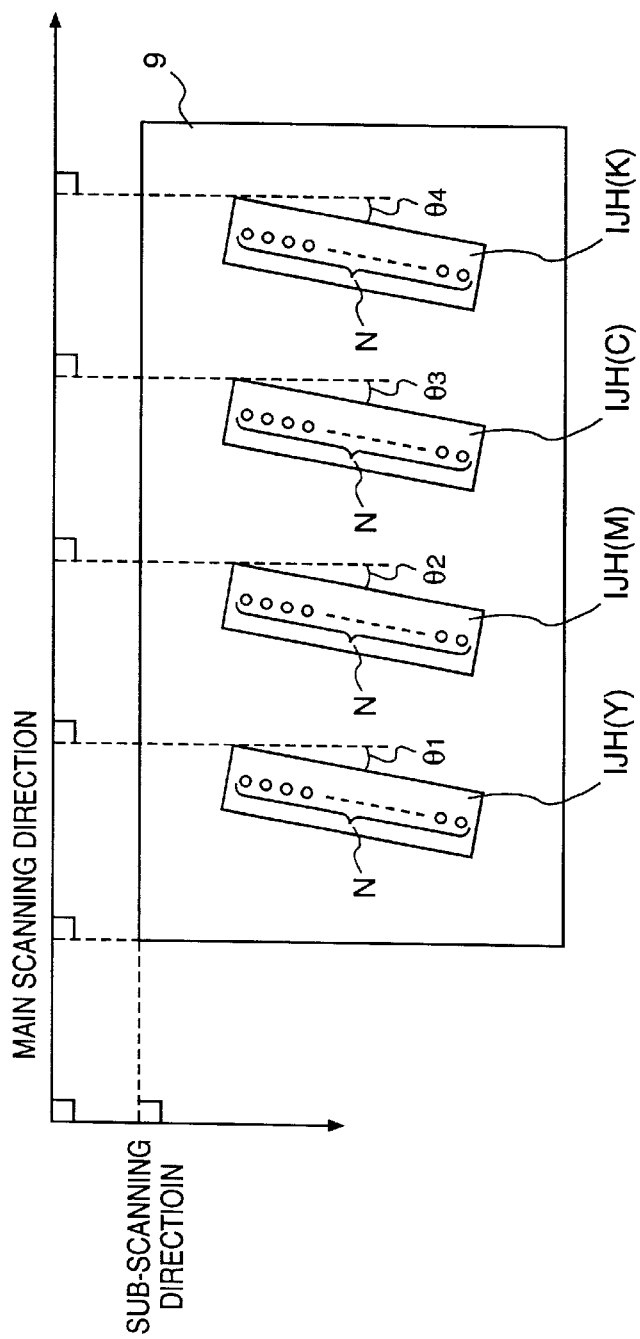

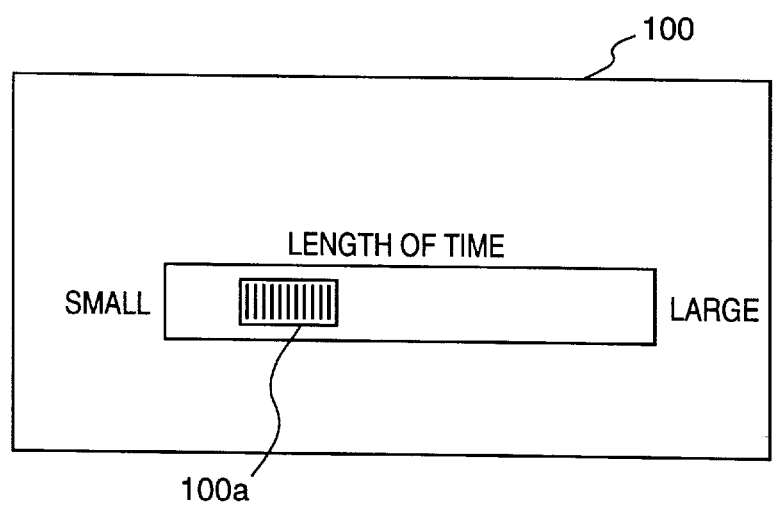

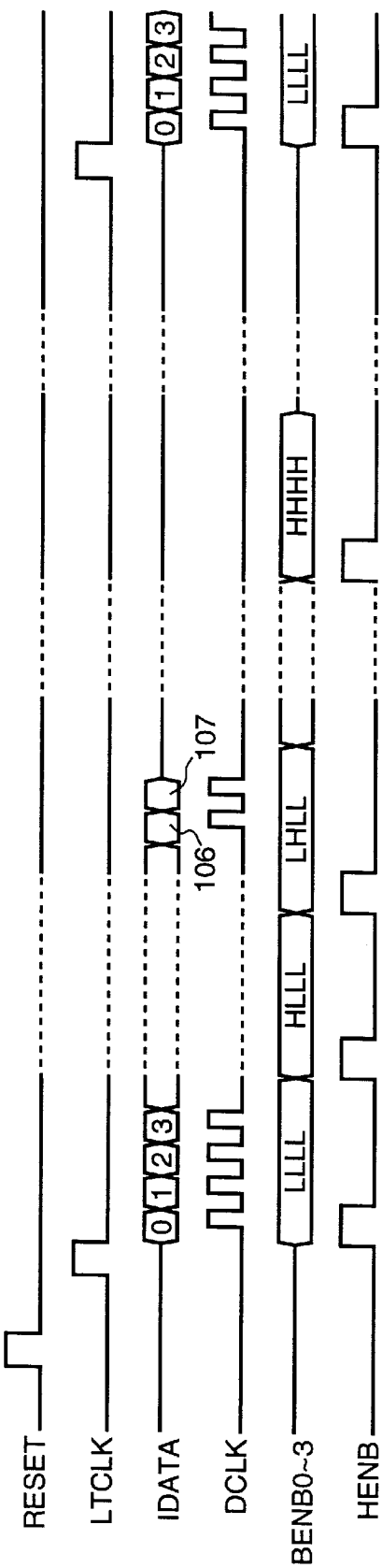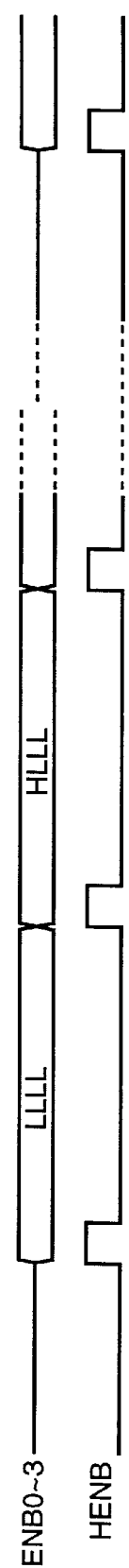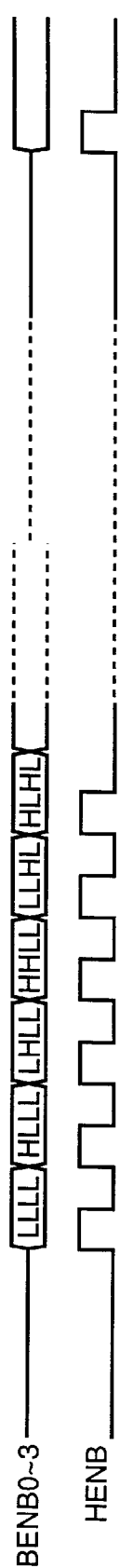

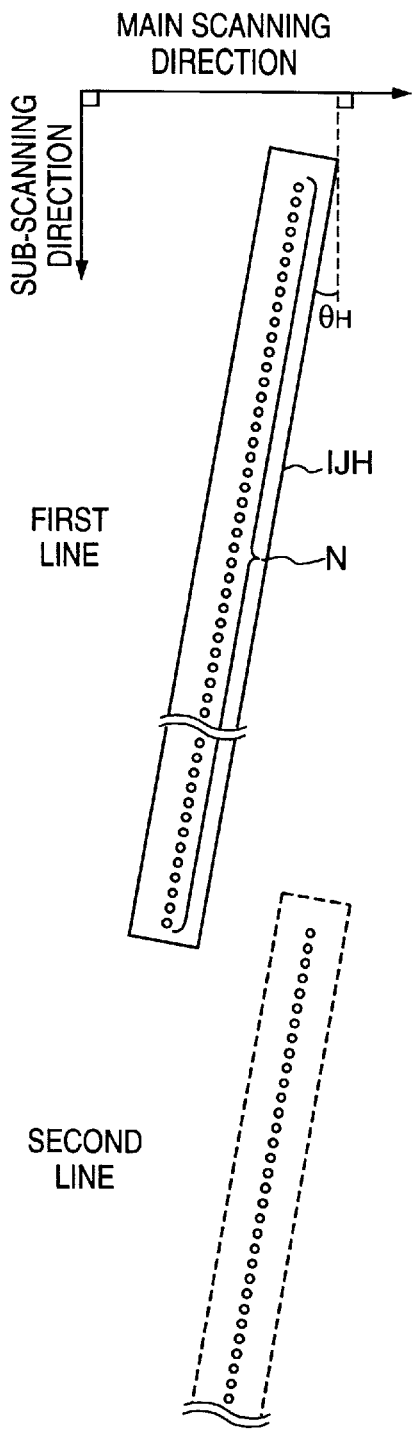
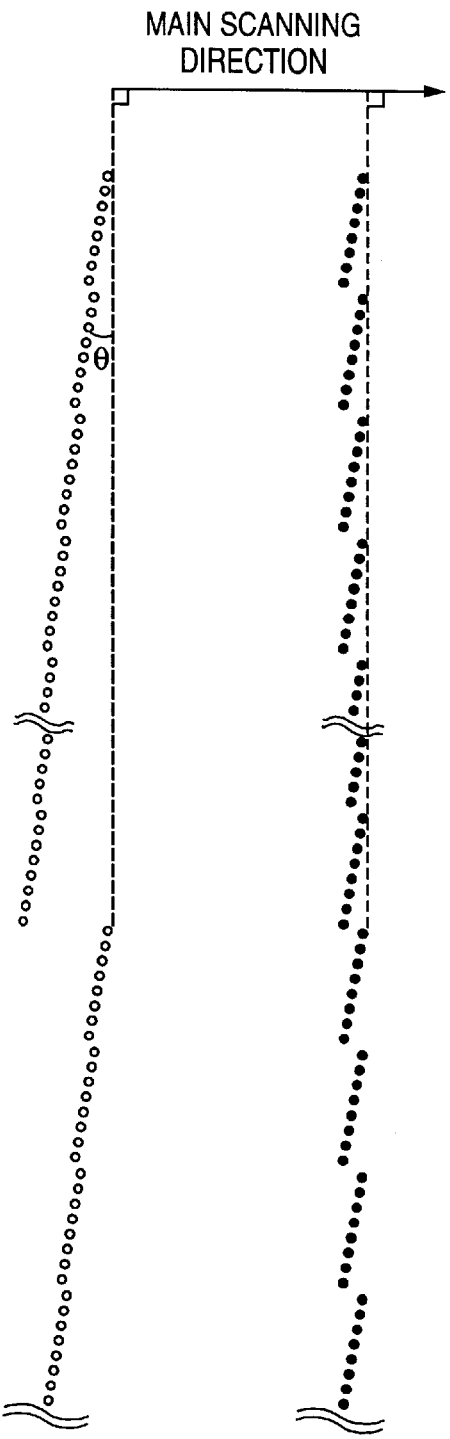
FIG. 10A  FIG. 10B  FIG. 10C

PRINTING APPARATUS AND METHOD

BACKGROUND OF THE INVENTION

The present invention relates to a printing apparatus and method which performs a print operation by scanning a print head having a plurality of printing elements in a direction perpendicular to the convey direction of a recording medium.

A conventional ink-jet printing apparatus is an apparatus for printing an image by discharging an ink. According to this printing scheme, a print head having a plurality of nozzles arranged at a predetermined width along the convey direction of a recording medium is scanned in a direction perpendicular to the nozzle array (this direction will be referred to as the main scanning direction hereinafter), while the recording medium is conveyed in a direction perpendicular to the main scanning direction (this direction will be referred to as the sub-scanning direction hereinafter), thereby printing an image on the recording medium. This ink discharging scheme using a print head includes a scheme of using energy generated by driving the heaters arranged in the nozzles and a scheme of using contraction of the piezoelectric elements arranged in the nozzles.

In either scheme, when all the nozzles arranged on a print head are simultaneously driven, an ink cannot be accurately discharged from the respective nozzles because of crosstalk and the like between the nozzles, resulting in a deterioration in print quality. In addition, since a large current must be temporarily supplied, a large-capacity power supply is required.

In order to solve such a problem, all the nozzles arranged on the print head are divided into blocks each including several nozzles, and the nozzles are driven to perform a print operation at different timings at which an ink is discharged from the respective blocks, thereby maintaining high print quality and suppressing the capacity of the power supply.

Assume that in the above method, an ink is sequentially discharged from groups of eight nozzles of a nozzle array N arranged on a print head IJH, starting from an end of the nozzle array N, at different discharge timings to perform a print operation. When a vertical ruled line, indicated by the solid line in FIG. 1A, is printed by the print width (the first line in FIG. 1A) of the print head IJH, the vertical ruled line is inclined at a predetermined angle ($\theta$). In addition, the second line (the vertical ruled line indicated by the dotted line in FIG. 1A and printed by the print head IJH), as a vertical ruled line, printed by a scanning operation following the scanning operation for the first line is inclined. Furthermore, the first and second lines as the vertical ruled lines become discontinuous.

For this reason, as shown in FIG. 1B, the print head IJH is mounted such that the nozzle array N of the print head IJH is inclined toward the sub-scanning direction by the inclination angle $\theta$ of each line printed as a ruled line as shown in FIG. 1A, thereby correcting each ruled line printed as a line to be vertical.

Assume that a print head is mounted such that the nozzle array is inclined toward the sub-scanning direction by the angle $\theta$. Even in this case, if the print head is of a replaceable type that is detachably mounted on a printing apparatus, the angle $\theta$ slightly deviates when the print head is mounted. As a result, vertical ruled lines are inclined, and the print quality deteriorates.

As shown in FIG. 2, a deterioration in print quality, e.g., color misregistration or a ruled line offset, occurs unless print heads IJH(Y), IJH(M), IJH(C), and IJH(K) for the respective colors, i.e., yellow, magenta, cyan, and black are accurately mounted at angles $\theta 1$, $\theta 2$, $\theta 3$, and $\theta 4$ in the main scanning direction and the sub-scanning direction as in an integral color head. Furthermore, it is more difficult to improve the mounting precision associated with the angle $\theta$ than to mount each print head in the main scanning direction and the sub-scanning direction, resulting in an increase in cost.

SUMMARY OF THE INVENTION

The present invention has been made in consideration of the above problems, and has as its object to provide a printing apparatus which improves print quality and can be manufactured at a low cost, and a method therefor.

In order to achieve the above object, a printing apparatus of the present invention has the following arrangement.

There is provided a printing apparatus for performing a print operation by scanning a print head having a plurality of printing elements in a direction perpendicular to a convey direction of a recording medium, comprising:

printing means for performing a divisional print operation using the print head upon respectively setting print timing differences for a plurality of blocks obtained by dividing the plurality of printing elements;

command means for giving a command to finely change the print timing differences; and control means for controlling the printing means to perform the divisional print operation by finely adjusting the print timing differences on the basis of the command from the command means.

In order to achieve the above object, a printing method of the present invention has the following arrangement.

There is provided a printing method of performing a print operation by scanning a print head having a plurality of printing elements in a direction perpendicular to a convey direction of a recording medium, comprising:

the print step of performing a divisional print operation using the print head upon respectively setting print timing differences for a plurality of blocks obtained by dividing the plurality of printing elements;

the command step of giving a command to finely change the print timing differences; and the control step of controlling the print step to perform the divisional print operation by finely adjusting the print timing differences on the basis of the command given in the command step.

As is apparent from the above description, according to the present invention, when a divisional print operation is to be performed by using the print head upon respectively setting print timing differences for a plurality of blocks obtained by dividing the plurality of printing elements, a command to finely change the print timing differences is input. The divisional print operation is performed by finely adjusting the print timing differences on the basis of the command. With this operation, a vertical ruled line offset which is noticeable on a printed image can be corrected to a precision that makes the vertical ruled line offset visually unnoticeable. As a result, the print quality can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is showing the arrangement of an integral color head;

FIG. 4B is a view for explaining the arrangement of an input unit 100 in this embodiment;

FIGS. 8A to 8C are timing charts in the print head IJH in this embodiment;

FIGS. 10A to 10C are views for explaining a method of correcting a vertical ruled line offset in this embodiment.

DETAILED DESCRIPTION OF THE PREFERRED EMBODIMENT

With the above arrangement, according to the present invention, in a printing apparatus for performing a print operation by scanning a print head having a plurality of printing elements in a direction perpendicular to the convey direction of a recording medium, the print operation is performed by a printing means for performing a divisional print operation using the print head upon dividing the plurality of printing elements into a plurality of blocks and setting different print timings for the respective blocks. In this case, the printing means is controlled to perform a divisional print operation while finely adjusting the print timing differences on the basis of a command to finely change the print timing differences.

In this printing apparatus, the plurality of printing elements are arranged in a line, and the element array is inclined at a predetermined angle in the convey direction.

The command given by the printing apparatus is either a command to perform a print operation in a direction in which the inclination of a pixel array printed on a recording medium by the print head at a predetermined angle increases, or a command to perform a print operation in a direction in which the inclination of a pixel array decreases.

The above print head may be of a type that performs a print operation by discharging an ink, like an ink-jet print head, or a type that discharges an ink by using heat energy, which type includes a heat energy converter for generating heat energy applied to an ink.

The preferred embodiment of the present invention will be described in detail below with reference to the accompanying drawings.

<Brief Description of Apparatus Body>

Figure 1A:
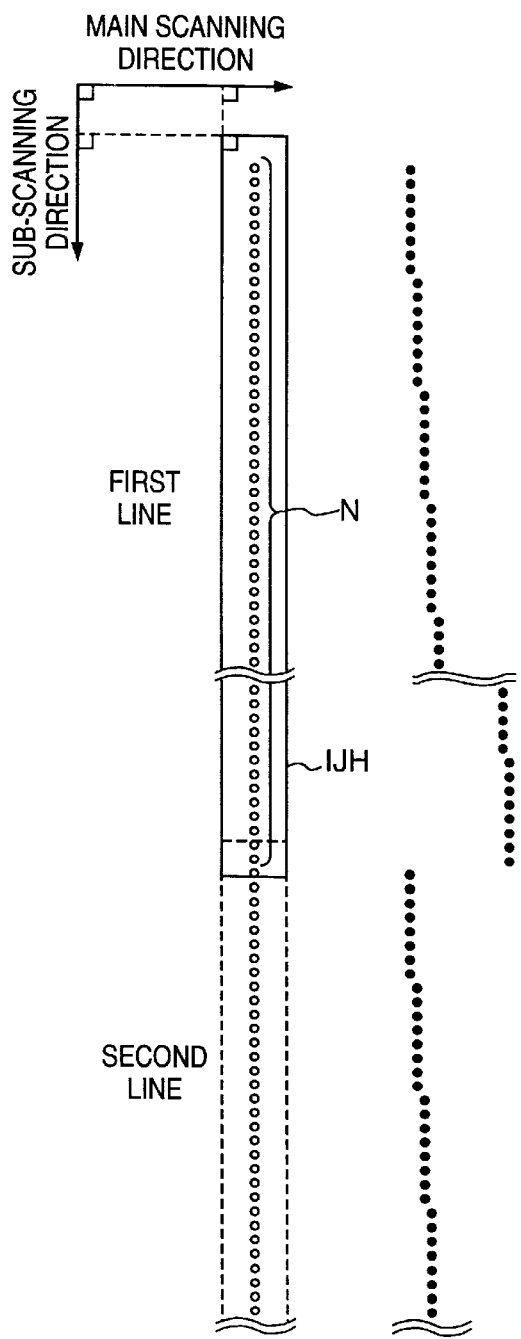
FIGS. 1A and 1B are views showing vertical ruled lines printed by a conventional apparatus.
Figure 1B:
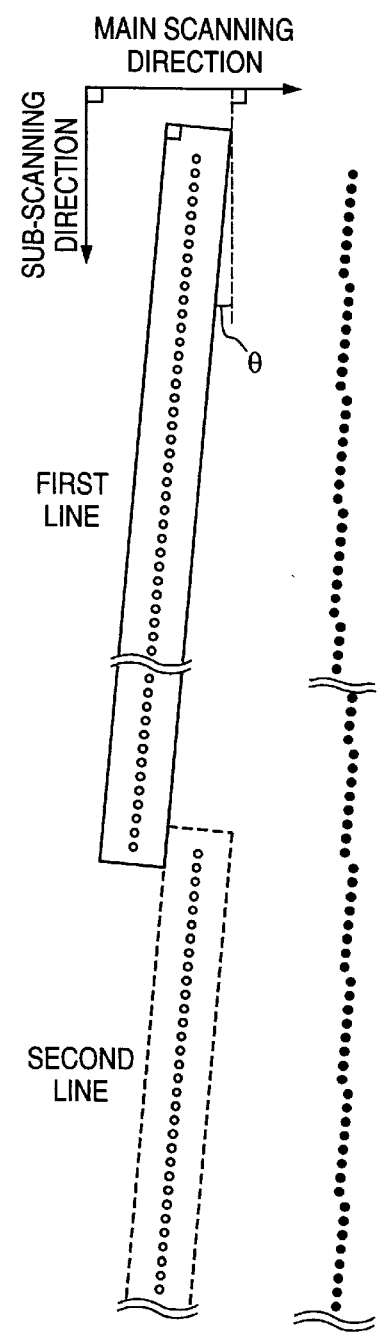
Figure 3:
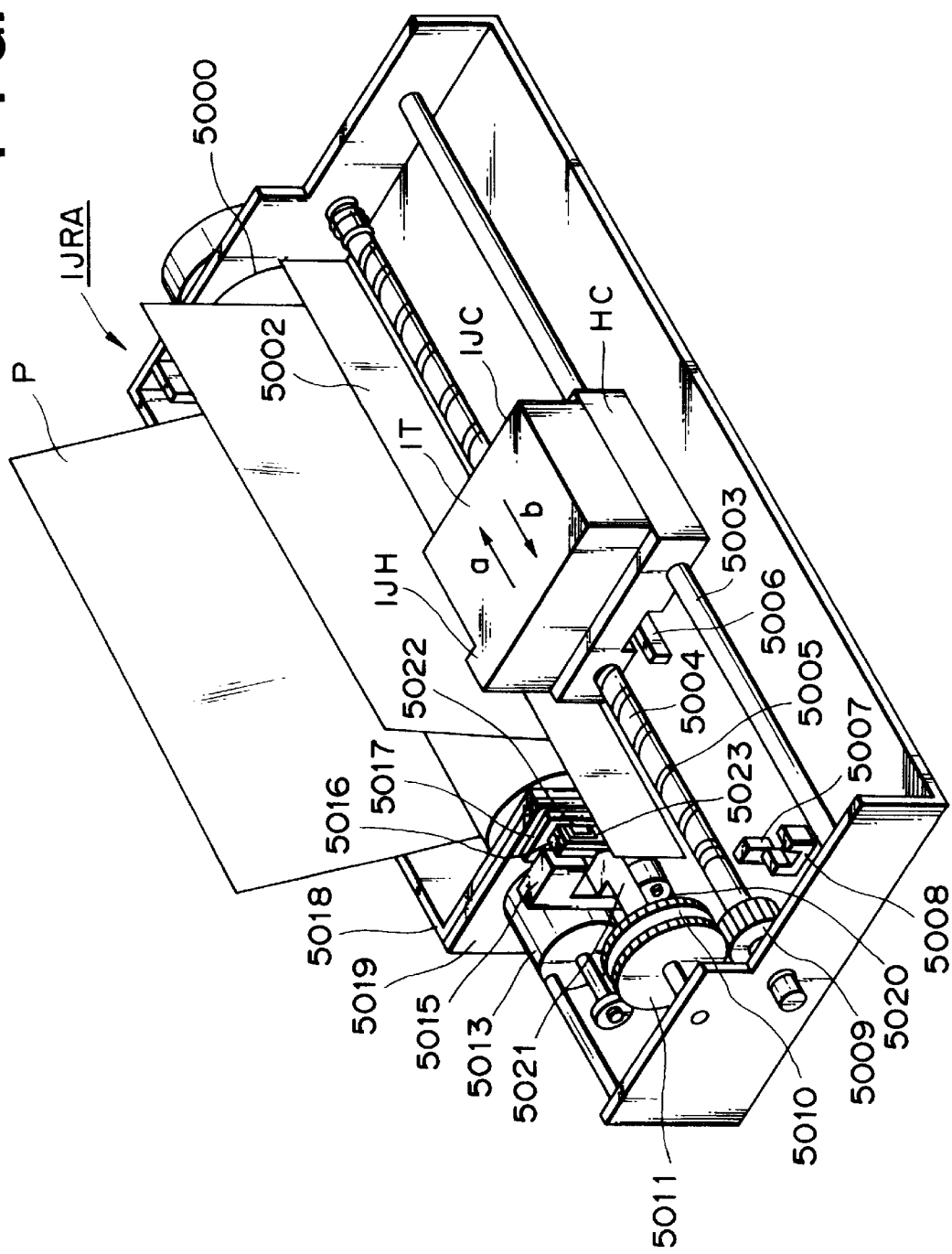
FIG. 3 is a perspective view showing the schematic structure of an ink-jet printer IJRA according to an embodiment of the present invention.

FIG. 3 is a perspective view showing the schematic arrangement of an ink-jet printer IJRA as a typical embodiment of the present invention.

Referring to FIG. 3, a carriage HC has a pin (not shown) and is engaged with a helical groove 5004 of a lead screw 5005 which rotates through driving power transmission gears 5009 to 5011 upon clockwise/counterclockwise rotation of a driving motor 5013. The carriage HC is supported by a guide rail 5003 and reciprocates in the directions indicated by arrows a and b. An integral ink-jet cartridge IJC incorporating a print head IJH and an ink tank IT is mounted on the carriage HC. Reference numeral 5002 denotes a paper press plate which presses printing paper P against a platen 5000 along the moving direction of the carriage HC; 5007 and 5008, photocouplers which are home position detectors for detecting a lever 5006 of the carriage HC in the respective detection ranges to perform an operation, e.g., switching the rotating direction of the driving motor 5013; 5016, a member for supporting a cap member 5022 for capping the front surface of the print head IJH; 5015, a suction device for applying suction to the cap member 5022 to perform suction recovery of the print head through an opening 5023 in the cap member 5022; 5017, a cleaning blade; and 5019, a member which enables the cleaning blade 5017 to move back and forth. The cleaning blade 5017 and the member 5019 are supported by a body support plate 5018. As is apparent, the cleaning blade 5017 is not limited to this form, but a known cleaning blade can be applied to this embodiment. Reference numeral 5021 denotes a lever for starting a sucking operation for suction recovery. The lever 5021 moves upon movement of a cam 5020 engaged with the carriage HC. Driving power from the driving motor to the lever 5021 is controlled for movement by a known transmission mechanism such as a clutch.

When the carriage HC moves to a region on the home position side, desired ones of these capping, cleaning, suction recovery operations can be performed at corresponding positions owing to the function of the lead screw 5005. If desired operations are performed at known timings, the above operations can be applied to this embodiment.

A control arrangement for executing print operation control of the above apparatus will be described next.

Figure 4A:
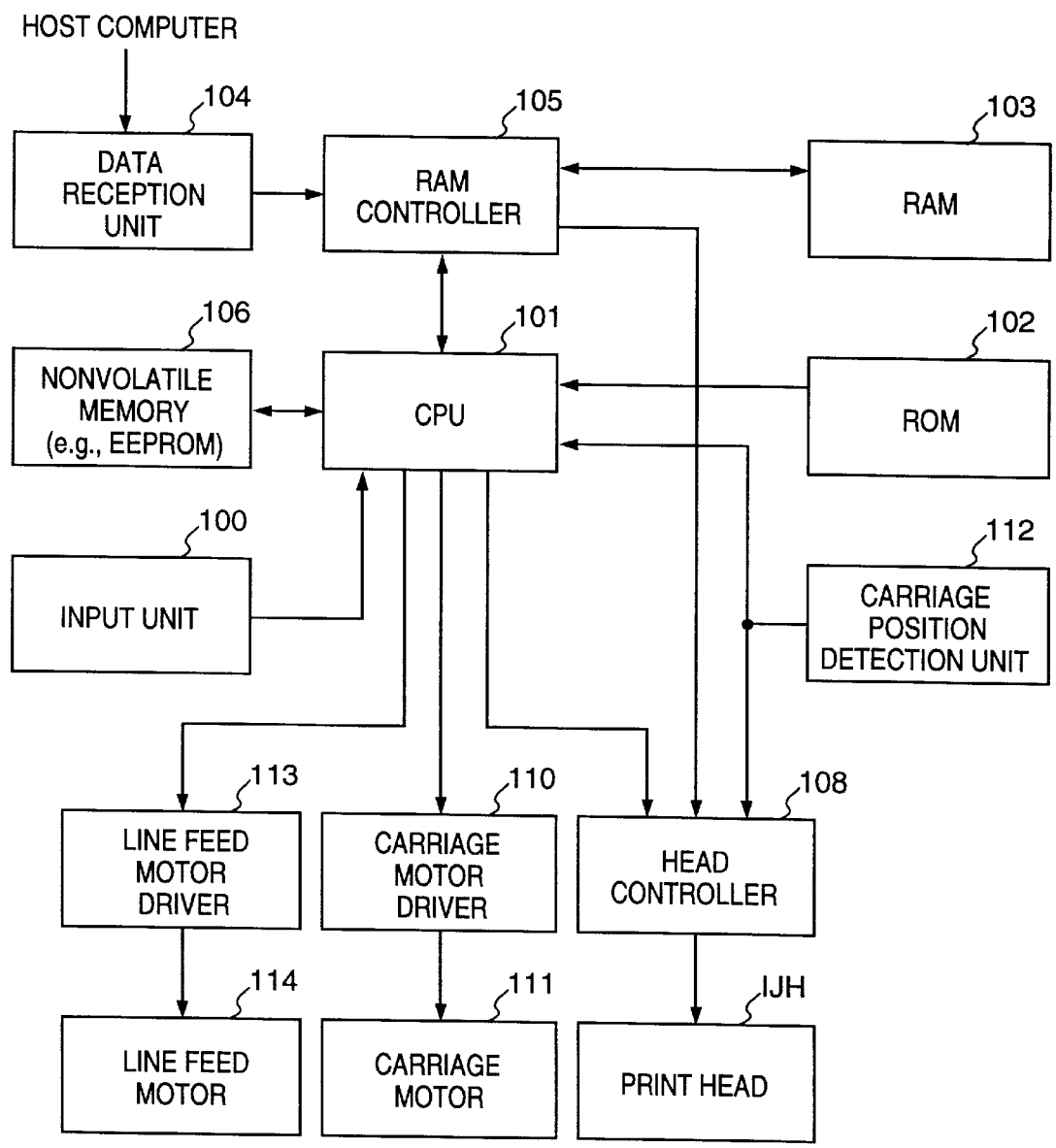
FIG. 4A is a block diagram showing the arrangement of a control circuit of the ink-jet printer IJRA of this embodiment.

FIG. 4A is a block diagram showing the arrangement of the control circuit of the ink-jet printer IJRA.

Referring to FIG. 4A, reference numeral 100 denotes an input unit for changing the length of time during which block enable signals BENB0 to BENB3 are output to set a desired length of time. In addition, a CPU 101 controls a print operation according to the set length of time. For example, the length of time is changed by using a slide switch arranged on the input unit 100, as shown in FIG. 4B. The CPU 101 executes operation control of this apparatus and data processing. Reference numeral 102 denotes a ROM which stores control programs for the CPU 101, various data for font processing, and a program for executing the processing shown in the flow chart of FIG. 11.

Reference numeral 103 denotes a RAM for temporarily storing various data including received image data; 104, a data reception unit for performing communication control between this apparatus and an external device (not shown) such as a host computer, and receiving image data transmitted from the external device; and 105, a RAM controller for transferring the image data received by the data reception unit 104 to the RAM 103 or transferring image data stored in the RAM 103 to a head controller 108, and controlling access from the CPU 101 to the RAM 103.

Reference numeral 106 denote a nonvolatile memory such as an EEPROM, which stores parameters unique to the ink-jet printer IJRA; and 108, a head controller for transferring image data to the print head IJH and generating various signals for driving the print head IJH under the control of the CPU 101.

A carriage motor driver 110, a carriage motor 111, and a carriage position detection unit 112 constitute a control system for moving the print head IJH (this direction will be referred to as a main scanning direction) in accordance with a control signal supplied from the CPU 101 and a print timing pulse from an encoder or the like. Similarly, a line feed motor driver 113 and a line feed motor 114 constitute a control system for conveying a recording medium such as the printing paper P (this direction will be referred to as a sub-scanning direction) in accordance with a control signal supplied from the CPU 101.

A procedure for print operation control will be described next with reference to FIG. 4A.

Image data input from a host computer through the data reception unit 104 is temporarily stored in the RAM controller 105. The CPU 101 executes a control program stored in the ROM 102 and analyzes a reception command, the image data, and character codes. Thereafter, the input image data is converted into print data by the CPU 101. The print data are sequentially stored in the RAM 103.

When development of one-line image data is completed, or a print instruction (one of the reception commands) is input, the carriage motor 111 is driven by the carriage motor driver 110, and the image data stored in the RAM 103 is sent as various signals such as a heat pulse signal to the print head IJH trough the RAM controller 105 and the head controller 108 in synchronism with a print timing pulse output from the carriage position detection unit 112. As a result, the print head IJH discharges an ink.

When a one-line image is printed, the line feed motor 114 is driven by the line feed motor driver 113 to start a new line, thus completing a series of steps. By repeating such a series of steps, a one-page print operation is completed.

Assume that the ink-jet printer IJRA of this embodiment is a monochrome printer, and has a resolution of 360 dpi, and the print head IJH has 128 nozzles. Also assume that image data to be handled in this embodiment is image data with each bit representing one pixel, i.e, one dot.

A print operation is performed in this embodiment according to a print scheme in which the nozzles of the print head IJH are sequentially divided into 16 blocks each including eight consecutive nozzles, starting from an end of the nozzle array, and an ink is discharged from the respective consecutive blocks at different ink discharge timings, thereby completing a print operation corresponding to the print width of the print head IJH.

Figure 5:
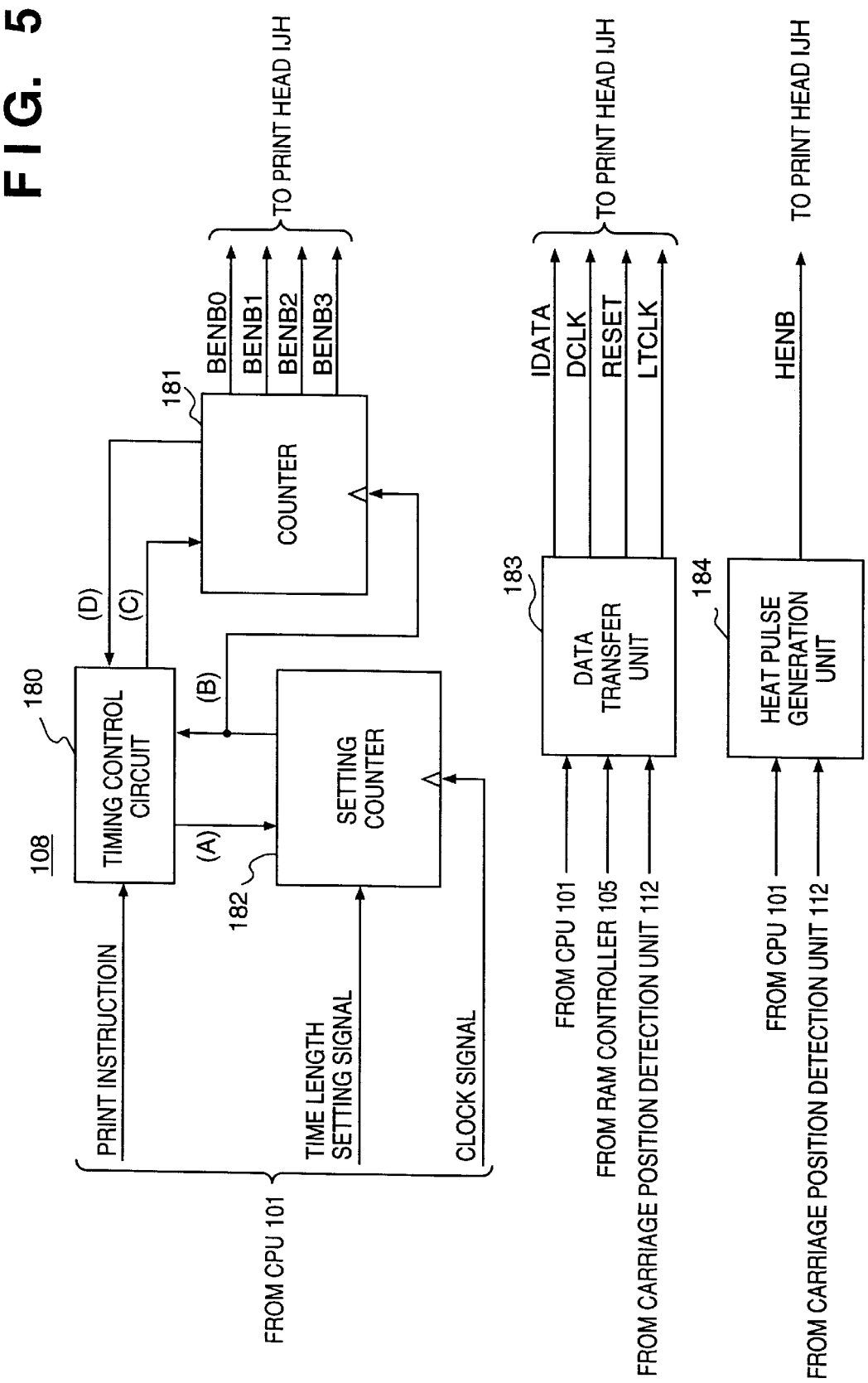
FIG. 5 is a block diagram showing the detailed arrangement of a head controller 108 in this embodiment.

FIG. 5 is a block diagram showing the detailed arrangement of the head controller 108 in this embodiment.

Referring to FIG. 5, reference numeral 180 denotes a timing control circuit for controlling a counter 181 and a setting counter 182 to discharge an ink from the respective divided regions of the nozzle array of the print head IJH at different ink discharge timings. The counter 181 indicates each region of the nozzle array from which an ink is discharged. The setting counter 182 indicates the length of time during which an ink is discharged from each of the divided regions of the nozzle array.

Reference numeral 183 denotes a data transfer unit for serially transferring image data sent from the RAM controller 105 to the print head IJH; and 184, a heat pulse generation unit.

Figure 6:
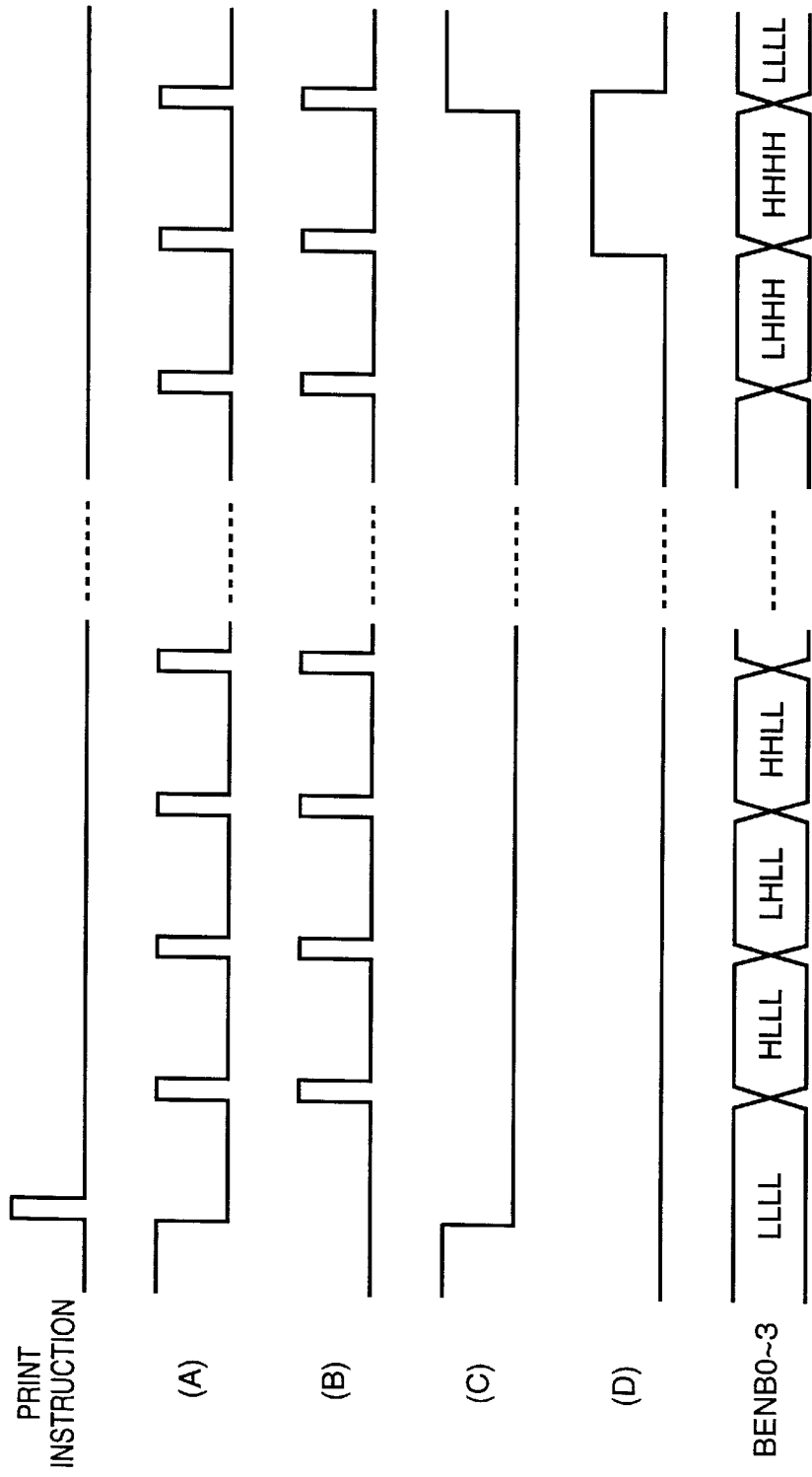
FIG. 6 is a timing chart in the head controller 108 in this embodiment.

The operation of the circuit in FIG. 5 will be described next with reference to FIG. 5 and the timing chart of FIG. 6.

Upon reception of a print instruction, the timing control circuit 180 outputs signals (A) and (B) to reset the setting counter 182 and the counter 181. After the print instruction is input, the timing control circuit 180 outputs the signal (A) to reset the setting counter 182 every time a signal (B) is input from the setting counter 182. In addition, every time a signal (D) is input from the counter 181, the timing control circuit 180 outputs the signal (C) to reset the counter 181.

When the contents of a time length signal from the CPU 101 are preset in the setting counter 182 in response to the signal (A), the setting counter 182 counts a predetermined period of time set in accordance with the time length signal from the CPU 101. Upon counting the predetermined period of time, the setting counter 182 outputs the signal (B) to the timing control circuit 180 and the counter 181.

Every time the signal (B) is input, the counter 181 counts and outputs the count value as block enable signals BENB0 to BENB3. Every time the signal (B) is counted 16 times, the counter 181 outputs a signal (D) to the timing control circuit 180.

The data transfer unit 183 outputs a reset signal RESET to the print head IJH under the control of the CPU 101. Thereafter, the data transfer unit 183 outputs a latch clock signal LTCLK. After the latch clock signal LTCLK is output, the data transfer unit 183 outputs one-bit image data IDATA sent from the RAM controller 105 to the print head IJH every time the clock of a data clock signal DCLK is output.

In addition, the data transfer unit 183 outputs a latch clock signal LTCLK every time the data clock signal DCLK is output 128 times.

Figure 7:
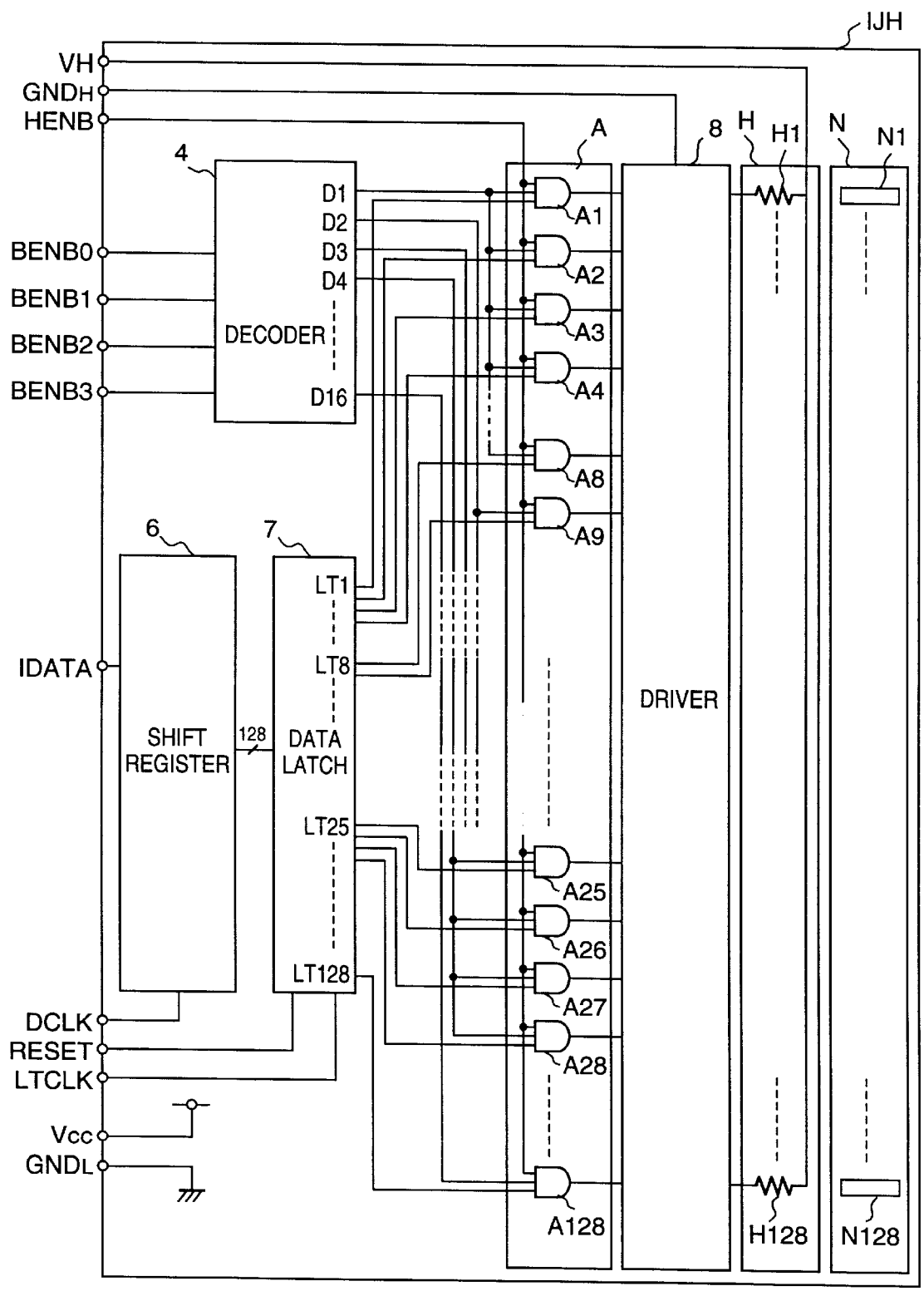
FIG. 7 is a block diagram showing the detailed circuit arrangement of a print head IJH in this embodiment.

FIG. 7 is a block diagram showing the detailed circuit arrangement of the print head IJH of this embodiment.

Referring to FIG. 7, reference symbol N denotes a nozzle group constituted by 128 nozzles N1 to N128. Discharge heaters H1 to H128 (discharge heater group H) are respectively arranged for the nozzles N1 to N128 in correspondence with the respective nozzle numbers.

Reference numeral 4 denotes a decoder having four input terminals and 16 output terminals D1 to D16. One of the output terminals D1 to D16 outputs an "H"-level signal in accordance with the an input pattern of the four-bit block enable signals BENB0 to BENB3. Reference symbol A denotes an AND gate group constituted by 128 AND gates A1 to A128. The AND gates A1 to A8 are connected to the output terminal D1 of the decoder 4, the AND gates A9 to A16 are connected to the output terminal D2 of the decoder 4, . . . , and finally, the AND gates A113 to A128 are connected to the output terminal D16 of the decoder 4. When "H"-level signals are output from some of the AND gates A1 to A128, discharge heaters corresponding to the corresponding numbers are driven through a head driver 8. The head driver 8 serves to drive the discharge heater group H.

Reference numeral 6 denotes a shift register to which the image data IDATA stored in the RAM 103 is input in units of bits through the head controller 108 every time the data clock signal DCLK is input. When image data corresponding to 128 bits are input to the shift register 6, the 128-bit image data is latched by a data latch 7 in response to a latch clock signal LTCLK.

The data latch 7 is designed to latch 128-bit image data. The data latch 7 has 128 output terminals LT1 to LT128 which are respectively connected to the AND gates A1 to A128 in corresponding to the respective terminal numbers. The data latch 7 outputs the latched image data to the AND gate group A in accordance with processing to be described later.

Reference symbols VH and GNDH denote terminals for applying a voltage to the discharge heater group H. The terminal GNDH is grounded. Reference symbols Vcc and GNDL denote power supplies for the print head IJH.

A print operation in this embodiment will be described next with reference to the circuit diagram of FIG. 7 and the timing charts of FIGS. 8A to 8C.

When a print command from the CPU 101 is input to the head controller 108, the data clock signal DCLK is output to the print head IJH. The shift register 6 stores the image data IDATA from the head controller 108 in units of bits every time the clock of the data clock signal DCLK is input. When the 128-bit image data IDATA is stored in the shift register 6, the latch clock signal LTCLK is output from the head controller 108 to the data latch 7. As a result, the 128-bit image data stored in the shift register 6 is latched in the data latch 7. Note that the contents latched in the data latch 7 are reset at the start of a print operation.

When the image data IDATA is latched in the data latch 7, the values of the block enable signals BENB0 to BENB3 are set such that BENB0=BENB1=BENB2=BENB3="L", thereby setting a heat enable signal HENB at "H" level. As a result, image data are output from the AND gates A1 to A8 corresponding to the output terminals LT1 to LT8 of the data latch 7 to the head driver 8. The head driver 8 then drives the discharge heaters H1 to H8 corresponding to the AND gates A1 to A8. With this operation, the ink is discharged from the nozzles N1 to N8 corresponding to the driven discharge heaters H1 to H8.

After a lapse of a predetermined period of time since the block enable signals BENB0 to BENB3 have been output, the values of the block enable signals BENB0 to BENB3 are set such that BENB0="H" and BENB1=BENB2=BENB3="L", thereby setting the heat enable signal HENB at "H" level. As a result, image data are output from the AND gates A9 to A16 corresponding to the output terminals LT9 to LT16 of the data latch 7 to the head driver 8. The head driver 8 then drives the discharge heaters H9 to H16 corresponding to the AND gates A9 to A16. As a result, the ink is discharged from the nozzles N9 to N16 corresponding to the driven discharge heaters H9 to H16.

Similarly, every time the values of the block enable signals BENB0 to BENB3 are sequentially updated, and the signals are output, the heat enable signal HENB is set at "H" level, thereby sequentially discharging the ink from the nozzles N17 to N24, N25 to N32, . . . , N113 to N128.

Such a print operation is repeatedly performed for one-line image data to complete the one-line print operation.

A method of correcting a vertical ruled line offset in this embodiment will be described below with reference to FIGS. 9A to 10C.

Figure 9A:
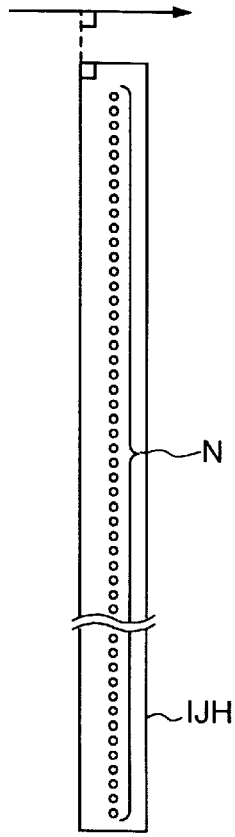
FIGS. 9A to 9C are views for explaining a method of correcting a vertical ruled line offset in this embodiment.
Figure 9B:
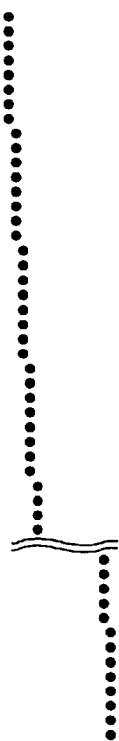
Figure 9C:
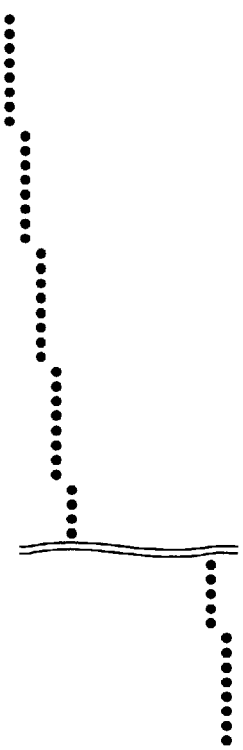

Each of FIGS. 9B and 9C shows the result obtained when a vertical ruled line is printed by scanning the nozzle group N of the print head IJH, which is mounted in a direction perpendicular to the main scanning direction as shown in FIG. 9A, in the main scanning direction.

Assume that the length of time during which the values represented by the block enable signals BENB0 to BENB3 output at once are output is the length of time shown in the timing chart of FIG. 8A, and FIG. 9B shows the result obtained when a vertical ruled line is printed in accordance with this length of time. In contrast to this, if the length of time of the block enable signals BENB0 to BENB3 output at once is increased as shown in FIG. 8B, since the discharge timings of the respective blocks each constituted by eight nozzles are sequentially delayed, the print positions of the respective segments of a vertical ruled line shift from each other as shown in FIG. 9C.

Considering the print operation shown in FIGS. 8A to 8C, assume that FIG. 10B shows the result obtained when a vertical ruled line is printed by using the nozzle array N mounted on the print head IJH at an inclination angle θH in the sub-scanning direction as shown in FIG. 10A. As is apparent from FIG. 10B, the overall vertical ruled line is inclined at an angle θ with respect to the inclination of the print head IJH.

When a print operation is performed as the length of time of the block enable signals BENB0 to BENB3 shown in FIGS. 8A to 8C is gradually increased, the inclination angle θ of the vertical ruled line approaches 0. When a print operation is performed according to the length of time with which a vertical ruled line visually becomes parallel to the sub-scanning direction as shown in FIG. 10C, no vertical ruled line offset is visually recognized. As a result, the respective line segments are printed to be visually continuous.

Note that in the case shown in FIG. 10B, the distance between the dot printed by discharging the ink from the eighth nozzle of the consecutive eight nozzles from the end of the nozzle array and the dot printed by discharging the ink from the first nozzle of the next consecutive eight nozzles is large. For this reason, jaggies are noticeable on the vertical ruled line as the result obtained by performing a print operation in units of eight nozzles.

In an actual print operation with a resolution of 360 dpi, however, the width of the jaggies on a vertical ruled line is as small as several μm. For this reason, almost no problem is posed from the viewpoint of a printed image as compared with a vertical ruled line offset between line segments. That is, a vertical ruled line offset caused by an offset of the mounting angle θ which is caused when a print head is mounted can be corrected by changing the length of time of the block enable signals BENB0 to BENB3.

Figure 11:
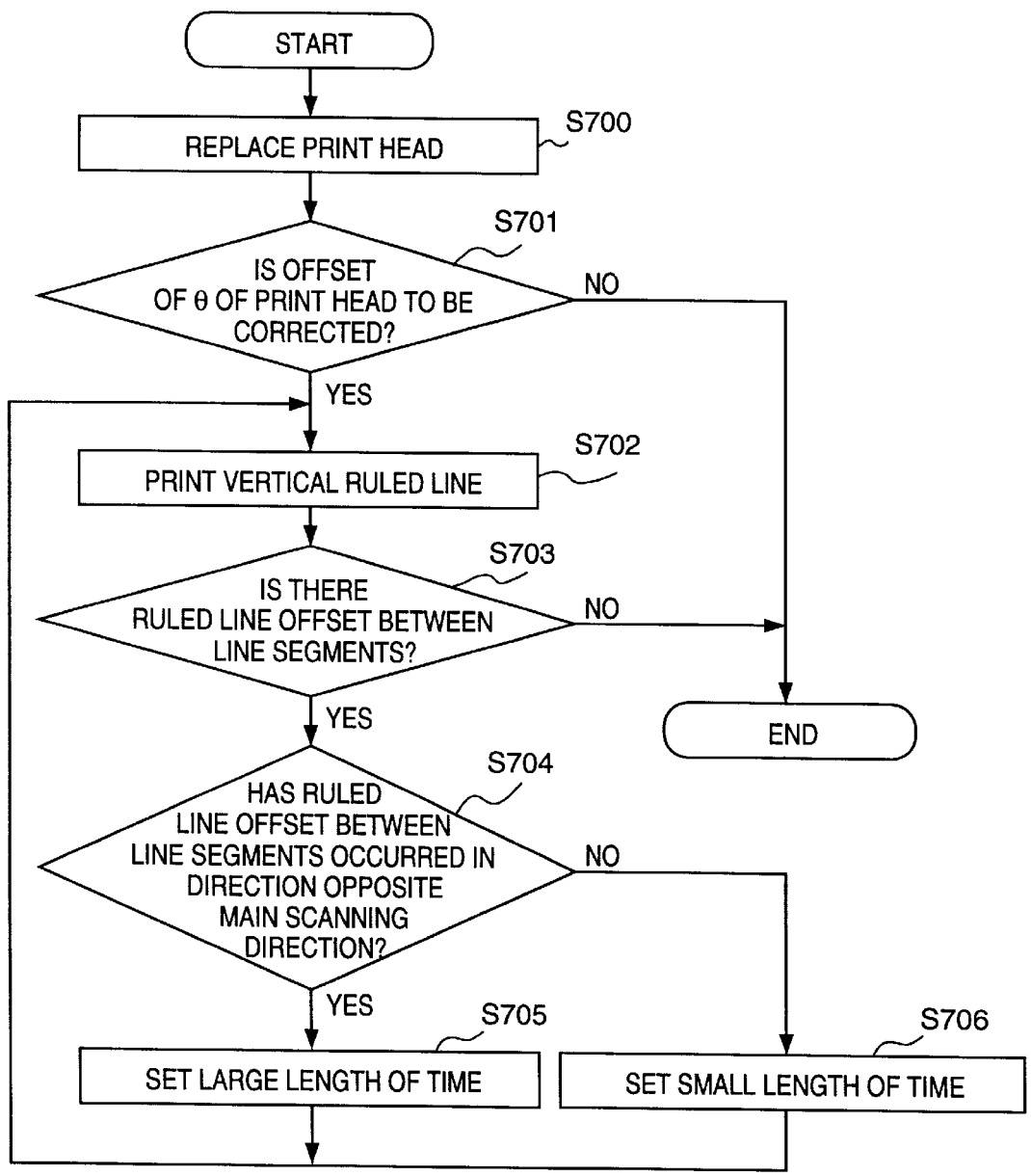
FIG. 11 is a flow chart showing the flow of processing in this embodiment.

In practice, an offset caused when a print head is manufactured or replaced is corrected in accordance with the flow chart of FIG. 11.

The flow of processing in this embodiment will be described next with reference to the flow chart of FIG. 11.

FIG. 11 is a flow chart showing the flow of processing in this embodiment.

In step S700, a print head is replaced. In step S701, it is checked whether an offset of θ of the print head is to be corrected. If no correction is performed (NO in step S701), processing is completed. However, if correction is required (YES in step S701), the flow advances to step S702. In step S702, a vertical ruled line is actually printed. In step S703, it is checked whether there is a ruled line offset between the line segments of the printed vertical ruled line. If there is no offset (NO in step S703), the processing is completed. If there is an offset (YES in step S703), the flow advances to step S704.

In step S704, it is checked whether the ruled line offset between the line segments has occurred in a direction opposite the main scanning direction with reference to the sub-scanning direction. If the offset has occurred in the opposite direction (YES in step S704), the flow advances to step S705.

In step S705, the length of time during which the block enable signals BENB0 to BENB3 are output is set to be large (see FIG. 8B).

If the offset has not occurred in the opposite direction (NO in step S704), the flow advances to step S706. In step S706, the length of time during which the block enable signals BENB0 to BENB3 are output is set to be small (see FIG. 8C).

For example, the corrected length of time during which the block enable signals BENB0 to BENB3 are output, which is obtained through the above processing, is stored in the nonvolatile memory 106 in the manufacturing process. By using the length of time stored in the nonvolatile memory 106 in an actual operation of the print head, a print operation can be performed while a ruled line offset (between line segments) unique to each operation is corrected.

If an offset is caused when a print head is replaced, the length of time is properly corrected every time a print head is replaced, and the determined length of time may be updated and stored.

This embodiment exemplifies the print head IJH in the monochrome printer. However, the present invention is not limited to this. For example, as shown in FIG. 2, the present invention can be applied to an integral color head. The integral color head is constituted by four print heads IJH(Y), IJH(M), IJH (C), and IJH(K) arranged in a frame 9. If a correction procedure like the one shown in FIG. 11 is applied to each print head, the present invention can be applied to an apparatus including a plurality of print heads. If, however, a vertical ruled line offset caused by any one of the print heads falls outside the allowable range when vertical ruled lines are actually printed, the present invention cannot be applied.

As described above, according to this embodiment, the nozzle array of the print head IJH is divided into blocks each including eight consecutive eight nozzles, starting from an end of the nozzle array. By changing the timings at which an ink is discharged from the respective consecutive blocks, i.e., a total of 16 divided blocks, an offset of a vertical ruled line printed by a print head, which is caused in the sub-scanning direction when a print head is manufactured or replaced, can be corrected with a precision that makes the offset unnoticeable to the user. The print quality can therefore be improved.

Even if a nozzle array is mounted with a low mounting precision in a manufacturing process, a vertical ruled line offset can be corrected by the above method with a precision that makes the offset unnoticeable. For this reason, a print head which is poor in mounting precision and hence conventionally regarded as "NG" can be used, resulting in a decrease in manufacturing cost.

If this embodiment uses a scheme, among various ink-jet print scheme, which has a means (e.g., an electricity-to-heat converter or laser light) for generating heat energy as energy used to discharge an ink, and changes the state of an ink by using the heat energy, a high-density, high-resolution print operation can be realized.

As for the typical structure and principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place are applied to the electricity-to-heat converter in accordance with print information so as to generate heat energy in the electricity-to-heat converter and to cause the heat effecting surface of the print head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or 4,345,262 is employed. If conditions disclosed in U.S. Pat. No. 4,313,124 which is an invention relating to the temperature rising ratio at the heat effecting surface are employed, a satisfactory print result can be obtained.

As an alternative to the structure (linear fluid passage or perpendicular fluid passage) of the print head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement that a common slot is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a print head of the full line type having a length corresponding to the maximum width of a recording medium which can be printed by the printing apparatus, either the construction which satisfies its length by a combination of a plurality of print heads as disclosed in the above specifications or the construction as a single full line type print head which has integrally been formed can be used.

In addition, the invention is effective for a print head of the freely exchangeable chip type which enables electrical connection to the printing apparatus main body or supply of ink from the main device by being mounted onto the apparatus main body, or for the case by use of a print head of the cartridge type having an ink tank provided integrally on the print head itself.

It is preferred to additionally employ the print head restoring means and the auxiliary means provided as the component of the present invention because the effect of the present invention can be further stabled. Specifically, it is preferable to employ a pressurizing or suction means for the print head, an electricity-to-heat converter, another heating element or a sub-heating means constituted by a combination of the above components and a pre-discharge mode in which an ink discharge operation is performed independently from the ink discharge operation in order to stably perform the print operation.

In addition, the printing apparatus is not limited to the print mode based on only a main color such as black, but may have at least one of a mode based on a plurality of different colors and a mode of realizing a full-color print operation using mixed colors. Such a mode may be realized by an integrated print head or a combination of a plurality of print heads.

Although a fluid ink is employed in the aforesaid embodiment of the present invention, an ink which is solidified at the room temperature or lower and as well as softened at the room temperature, an ink in the form of a fluid at the room temperature, or an ink which is formed into a fluid when the print signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, an ink which is solidified when it is caused to stand, and liquified when heat energy is supplied in accordance with a print signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a print signal so as to be discharged in the form of fluid ink, or an ink which is liquified only after heat energy is supplied, e.g., an ink which starts to solidify when it reaches a recording medium, can be adapted to the present invention. In the aforesaid case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

The printing apparatus of the present invention may include an apparatus integrally or separately provided as an image output terminal for information processing equipment such as a computer, a copying machine combined with a reader or the like, and a facsimile apparatus having a transmission/reception function.

The present invention may be applied to a system constituted by a plurality of devices (e.g., a host computer, an interface device, a reader, and a printer), or an apparatus (e.g., a copying machine or a facsimile apparatus) constituted by one device.

As is apparent, the object of the present invention can be achieved by supplying a storage medium, on which the program codes of software for realizing the functions of the above embodiment, to a system or an apparatus, and causing the computer (CPU or MPU) of the system or the apparatus to read out the program codes from the storage means and execute them.

In this case, the program codes read out from the storage medium realize the functions of the above embodiment, and the storage medium storing the program codes is a constituent element of the present invention.

As the storage medium for supplying program codes, for example, a floppy disk, a hard disk, an optical disk, a magnetooptical disk, a CD-ROM, a CD-R, a magnetic tape, a nonvolatile memory card, or a ROM can be used.

As is apparent, the functions of the above embodiment can be realized by causing an OS (operating system) operating on a computer to actually perform part or all of processing on the basis of the commands of program codes, as well as by causing the computer to execute the readout program codes.

Furthermore, as is apparent, the functions of the above embodiment can be realized in such a manner that program codes read out from a storage means are written in a memory mounted on a function expansion board inserted into a computer or on a function expansion unit connected to the computer, and a CPU or the like mounted on the function expansion board or unit performs part or all of actual processing.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for performing a print operation by scanning a print head having a plurality of printing elements in a direction perpendicular to a convey direction of a recording medium, comprising:

printing means for performing a divisional print operation using said print head upon respectively setting print timing differences for a plurality of blocks obtained by dividing the plurality of printing elements;

adjusting means for adjusting the print timing differences; and control means for controlling said printing means to perform the divisional print operation in accordance with the print timing differences adjusted by said adjusting means.

2. The apparatus according to claim 1, wherein the plurality of printing elements are arranged in an array, the array being inclined at a predetermined angle in the convey direction.

3. The apparatus according to claim 2, wherein the adjustment by said adjusting means includes a command to perform a print operation in a direction in which an inclination of a pixel array printed on the recording medium by said print head according to the predetermined angle increases, and a command to perform a print operation in a direction in which the inclination of the pixel array decreases.

4. The apparatus according to claim 1, wherein said print head is an ink-jet print head for performing a print operation by discharging an ink.

5. The apparatus according to claim 1, wherein said print head is a print head for discharging an ink by using heat energy, and comprises a heat energy converter for generating heat energy applied to the ink.

6. A printing method of performing a divisional print operation using a print head having a plurality of printing elements upon respectively setting print timing differences for a plurality of blocks obtained by dividing the plurality of printing elements by scanning the print head in a direction perpendicular to a convey direction of a recording medium, comprising the steps of:

a first print step of printing a pattern for adjusting the print timing differences;

an adjusting step of adjusting the print timing differences to reduce printing position offset in accordance with the pattern printed at said first print step; and a second print step of printing the recording medium by driving each block of the plurality of blocks of the printing head in accordance with the print timing adjusted in said adjusting step.

7. The method according to claim 6, wherein the plurality of printing elements are arranged in an array, the array being inclined at a predetermined angle in the convey direction.

8. The method according to claim 7, wherein the adjustment in the adjusting step includes a command to perform a print operation in a direction in which an inclination of a pixel array printed on the recording medium by said print head according to the predetermined angle increases, and a command to perform a print operation in a direction in which the inclination of the pixel array decreases.

9. The method according to claim 6, wherein said print head is an ink-jet print head for performing a print operation by discharging an ink.

10. The method according to claim 6, wherein said print head is a print head for discharging an ink by using heat energy, and comprises a heat energy converter for generating heat energy applied to the ink.

11. A printing apparatus for performing a print operation by scanning a print head having a plurality of printing elements in a direction perpendicular to a convey direction of a recording medium, comprising:

driving means for driving each block of a plurality of blocks obtained by dividing the plurality of printing elements into groups of predetermined numbers of printing elements each having a different print timing;

adjusting means for adjusting a print timing interval of consecutively driven blocks of the plurality of blocks; and control means for controlling said driving means in accordance with the print timing interval adjusted by said adjusting means.

12. A printing method of performing a print operation by scanning a print head having a plurality of printing elements in a direction perpendicular to a convey direction of a recording medium, the method comprising:

a first step of printing on the recording medium by driving each block of a plurality of blocks obtained by dividing the plurality of printing elements into groups of predetermined numbers of printing elements each having a different print timing;

a second step of adjusting a print timing interval of consecutively driven blocks of the plurality of blocks in accordance with a result printed at said first step; and a third step of printing the recording medium by driving each block of the plurality of blocks of the printing head in accordance with the print timing interval adjusted at said second step.

* * * * *

UNITED STATES PATENT AND TRADEMARK OFFICE
CERTIFICATE OF CORRECTION

PATENT NO.   : 6,019,453
DATED        : February 1, 2000
INVENTOR(S)  : YUJI TSURNOKA It is certified that error appears in the above-identified patent and that said Letters Patent is hereby corrected as shown below:

<u>ON TITLE PAGE AT [30] FOREIGN APPLICATION PRIORITY DATA</u>

"Dec. 10, 1995" should read --Oct. 12, 1994--.

<u>COLUMN 5</u>

Line 28, "trough" should read --through--.

<u>COLUMN 6</u>

Line 38, "the" (first occurrence) should be deleted;
Line 60, "incorresponding" should read --corresponding--.

<u>COLUMN 9</u>

Line 42, "scheme" should read --schemes--.

<u>COLUMN 10</u>

Line 4, "is" should read --be--;
Line 42, "stabled" should read --stabilized--.

UNITED STATES PATENT AND TRADEMARK OFFICE
CERTIFICATE OF CORRECTION

PATENT NO.   : 6,019,453

DATED        : February 1, 2000

INVENTOR(S)  : YUJI TSURNOKA

It is certified that error appears in the above-identified patent and that said Letters Patent is hereby corrected as shown below:

<u>COLUMN 11</u>

Line 48, "of" should read --of the--;
   Line 58, "of" should read --of the--.

Signed and Sealed this

Twenty-fourth Day of April, 2001

Attest:

NICHOLAS P. GODICI

*Attesting Officer*    *Acting Director of the United States Patent and Trademark Office*